United States Patent [19]

Applequist et al.

[11] 4,428,012
[45] Jan. 24, 1984

[54] METHOD AND APPARATUS FOR STORING AND RETRIEVING INFORMATION

[75] Inventors: Roy A. Applequist, Windsor, Calif.; Richard M. Altobellis, Jamestown, Colo.; Glade N. Bagnell, Louisville, Colo.; Robert F. Hoppe, Longmont, Colo.; James O. Jacques, Boulder, Colo.; Terry G. Johnson, Longmont, Colo.

[73] Assignee: MiniScribe Corporation, Longmont, Colo.

[21] Appl. No.: 260,495

[22] Filed: May 4, 1981

[51] Int. Cl.³ .................... G11B 5/55; G11B 21/08
[52] U.S. Cl. ................................................. 360/106
[58] Field of Search ......................... 360/102–109, 360/74.1, 74.4, 75; 74/89–89.2, 109

[56] References Cited

U.S. PATENT DOCUMENTS

| | | | |
|---|---|---|---|
| 3,922,718 | 11/1975 | Halfhill et al. | 360/106 |
| 3,969,768 | 7/1976 | Ebbing | 360/106 |
| 3,992,576 | 11/1976 | Sugiura | 360/103 |
| 4,030,137 | 6/1977 | Dalziel | 360/106 |
| 4,143,409 | 3/1979 | Iwabuchi et al. | |

Primary Examiner—Aristotelis M. Psitos
Assistant Examiner—Kin Wong
Attorney, Agent, or Firm—Curtis, Morris & Safford

[57] ABSTRACT

In a device for retrieving and recording (read/write) information on at least one rigid disk, a stepping motor servo system operated in an open-loop manner is provided to rapidly and accurately position read/write heads relative to the disk. A fixed guide shaft adjacent to and transverse to the motor shaft carries a carriage slidably thereon, preferably on oil impregnated bearings, the carriage member including a gear rack and the stepping motor having a pinion gear thereon interfacing with the gear rack. A preload bearing is urged against the carriage at a position between the guide shaft and the pinion gear such that the carriage is rotated around the guide shaft into engagement with the pinion gear at the rack portion thereof. The stepping motor is preferably fixed to the device chassis at a position and location spaced from the pinion gear a distance corresponding to the distance of a preferred spring steel head support arm utilized to carry the read/write head, to compensate for thermal expansion differences between the chassis material, and the spring steel head support arm.

15 Claims, 5 Drawing Figures

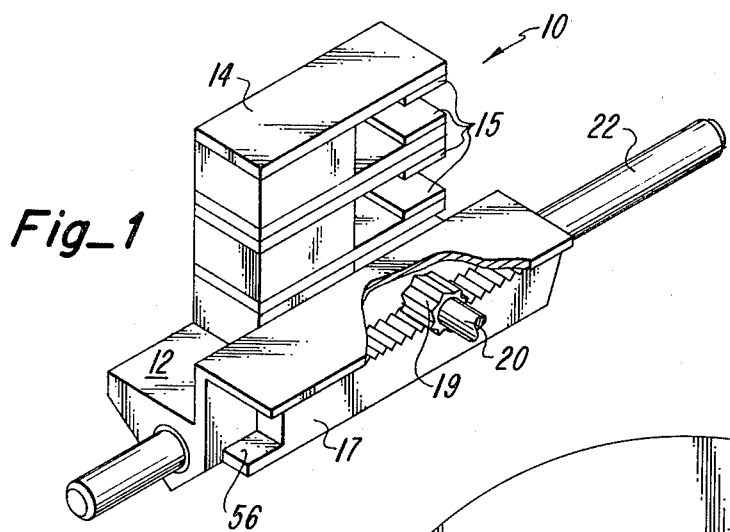
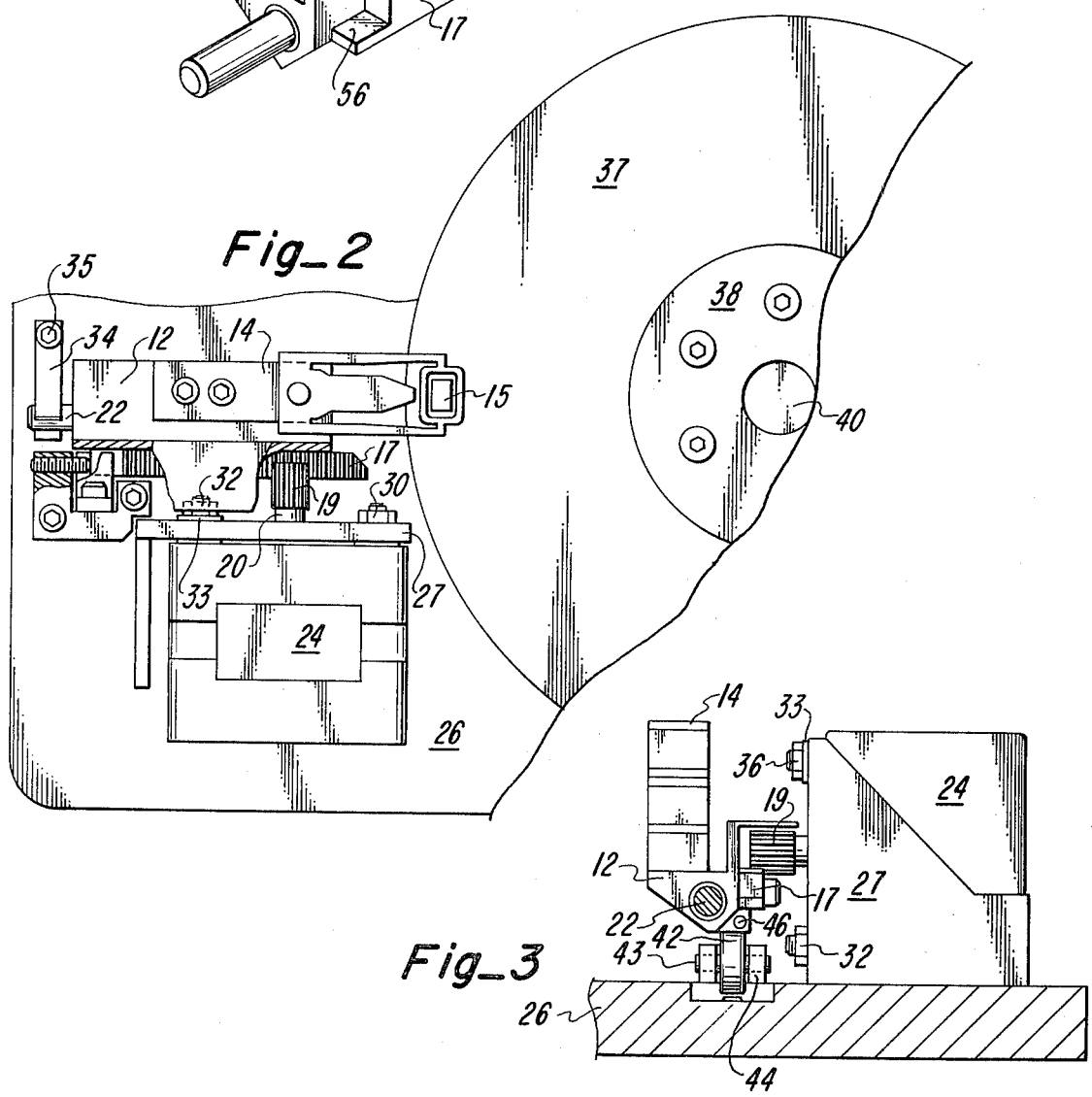

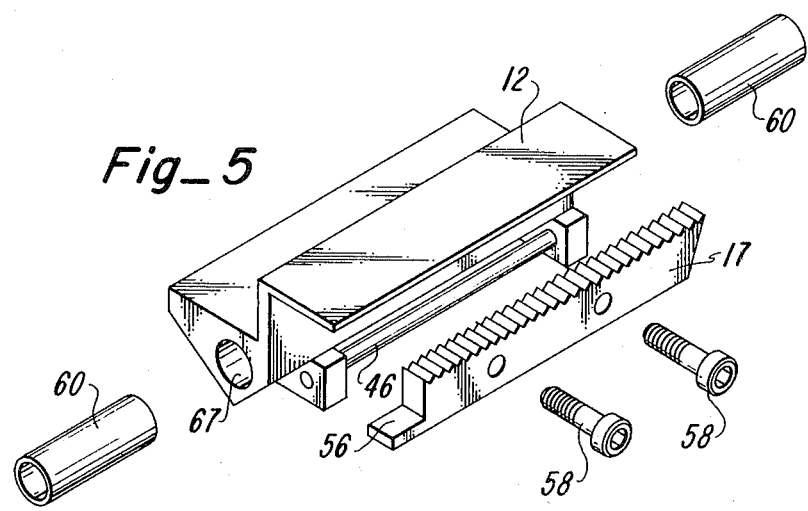
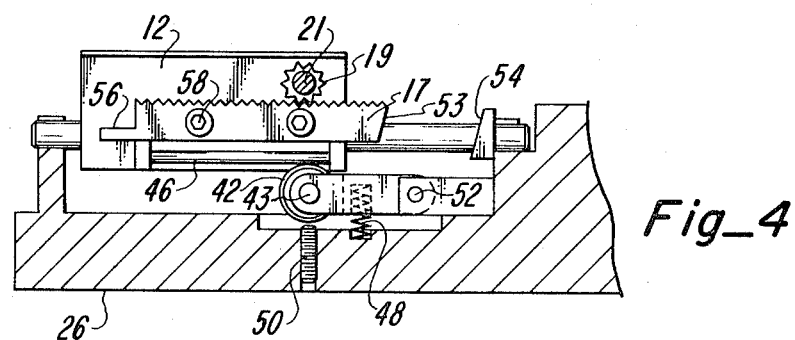

METHOD AND APPARATUS FOR STORING AND RETRIEVING INFORMATION

BACKGROUND OF THE INVENTION

1. Field of the Invention

This invention relates generally to relatively high speed, high density information storage and retrieval mechanisms utilizing a storage medium carried on a rigid disk, and more particularly to an improved read/write positioning mechanism for an open-loop positioning of the read/write head of such a device.

2. Description of the Prior Art

Amongst the electromechanical devices utilized for auxiliary memory and data storage, the so-called Winchester Drive provides the more advanced and economical means for data storage. Fundamentally, Winchester Drives utilize a spinning disk, typically an aluminum disk having a magnetic oxide coating thereon, which stores data as provided by a read/write head in concentric, closely spaced rings or tracks on the disk. Typically the read/write heads are carried on access arms and positioned adjacent to both sides of the spinning disk with the head induced to "fly" adjacent the disk as a result of an air layer carried by the spinning disk. In order to provide the high density of data in the oxide coating it is necessary that the read/write head be spaced closely adjacent the oxide coating, i.e., on the order of ½ to 1 microns, and that closely packed concentric tracks of data be recorded on the spinning disk. To accomplish this latter objective, it is necessary that the read/write head be positioned extremely accurately along the radius of the spinning disk to facilitate such close spacing of the recorded data.

Positioning of the read/write heads relative to the spinning disk is conventionally accomplished according to two broad servo system approaches, i.e., closed-loop and open-loop systems. In the more involved and expensive closed loop system, reference positions, either dedicated or embedded in the recorded data, are provided on the disk itself such that the servo positioning of the read/write head may be accurately accomplished by search for and recognition of reference matter recorded upon the disk medium or transducer means, separate from the recording disks—such as optical, inductive, or capacitive transducers mounted to the actuator. However, in the latter instance, i.e., open-loop systems, the read/write head is positioned relative to the spinning disk by, in a typical instance, indexing a stepping motor to a predetermined position such that the read/write head is reproducibly positioned adjacent the selected concentric track of data. Since the concentric data tracks are typically spaced 2 to 4 thousandths of an inch apart, it will be recognized that rapid and accurate reproducible positioning of the read/write head across a disk which may be typically 5¼ inches in diameter is an extremely demanding undertaking.

An example of a positioning mechanism adapted for use in an open-loop system, such as a Winchester Drive, is to be found in U.S. Pat. No. 4,161,004, issued July 10, 1979. This patent discusses a capstan drive around which a flexible band is positioned with the band attached to a carriage mechanism. As a motor rotates the capstan, the band drives the carriage to a preselected position. Though the patented drive mechanism has proven economical and effective, certain shortcomings have also been noted. The structure of the band-capstan interface requires that the band be attached to the capstan thereby permitting but one rotation of the stepping motor attached to the capstan before the limited travel of the band is reached. Accordingly, the resolution of the head position is limited by the incremental movement of the stepping motor, or influenced by the cost of a stepping motor of very small incremental movement. However, given the great demands of an open-loop system in which the dimensions between the stepping motor and the read/write head must be precisely maintained under varying conditions and in the face of wear, other seemingly simple mechanical means, such as the lead screw means discussed in U.S. Pat No. 3,814,441 also suffer from various drawbacks. In addition to the need for accurate and reproducible positioning, the head must also move with great acceleration and deceleration to the desired track. Accordingly, inertial forces must be minimized, and movement dampened rapidly to permit the head to assume a steady position over the desired track. However, motion dampers add mass thus requiring yet another compromise in the known designs.

SUMMARY OF THE INVENTION

According to the instant invention, read/write heads are positioned on load arms carried on a carriage member slidably mounted on a guide shaft for reciprocating movement. The carriage shaft includes on one portion thereof an elongated gear rack which intermeshes with a pinion gear carried on the end of a stepping motor controlled in a conventional manner. At a position between the guide shaft and gear rack, a preload bearing, preferably spring loaded, urges the carriage to rotate around the guide shaft to maintain the gear rack in engagement with the pinion gear, thereby compensating for wear and lash between the gear rack and the pinion gear as well as minimizing possible jumping of the gear teeth between the gear rack and pinion gear. Oil impregnated bushings, preferably sintered copper-bronze bushings having oil impregnated therein, are provided between the guide shaft and carriage to provide a highly desirable dynamic damping of the carriage relative to the guide shaft. In a particularly preferably embodiment of the invention, dissimilar metals are strategically positioned and attached to one another to provide for temperature compensation of the read/write head position relative to the spinning disk.

Accordingly, an object of the present invention is to provide a new and improved method and apparatus for accurately and rapidly positioning read/write heads in disk storage devices utilizing open-loop servo systems.

Another object of the present invention is to provide a new and improved method and apparatus for positioning read/write heads in disk storage devices with a minimum of moving parts.

Yet another object of the present invention is to provide a new and improved method and apparatus for positioning a read/write head in a disk storage device which permits more than one revolution of a stepping motor drive.

Still another object of the present invention is to provide a new and improved method and apparatus for positioning the read/write head of a disk data storage device which utilizes a low inertia damping structure.

Yet another object of the present invention is to provide a new and improved method and apparatus for positioning a read/write head which permits a continuous positive engagement between the motor drive and carriage movement.

Yet still another object of the present invention is to provide a new and improved method and apparatus for a disk drive data storage device in which temperature compensation is achieved with the basic structural components to permit accurate location of the read/write head in an open loop servo mechanism.

Still yet another object of the present invention is to provide improved "crash stop" which simultaneously provides high pinion engagement forces thus preventing slippage between rack and pinion.

These and other objects and features of the present invention will become apparent from the drawings and following description.

BRIEF DESCRIPTION OF THE DRAWINGS

In the Drawings:

FIG. 1 is a perspective view of a partially cut-away carriage drive mechanism in accord with the present invention;

FIG. 2 is a top view, partially cut-away, of a disk drive apparatus utilizing the carriage drive mechanism of FIG. 1;

FIG. 3 is an end view of the motor and carriage drive mechanism, in section, particularly illustrating the preload arrangement;

FIG. 4 is a partial side view of the mechanism of FIG. 2 in section; and

FIG. 5 is an exploded view of the carriage member of FIG. 1.

DETAILED DESCRIPTION OF THE INVENTION

Turning now to the drawings, wherein like components are designated by like reference numerals throughout the various Figures, a carriage structure in accord with the instant invention is illustrated in FIG. 1 and generally designated by reference numeral 10. As shown, carriage structure 10 includes carriage member 12 which supports a number of head load arms 14 (not shown to scale or form) each of which carries at least one read/write head 15 (shown symbolically) to interface on either side of a rotating disk. Carriage member 12 also carries gear rack 17 adapted to interface with pinion gear 19 supported on motor shaft 20. Thus, upon rotation of pinion gear 19 with motor shaft 20, carriage member 12 will be urged to move along guide shaft 22, mounted in a fixed position to slidably carry carriage member 12.

With reference to FIG. 2, it will be seen that stepping motor 24, which is controlled in a conventional manner beyond the scope of this discussion, is mounted to chassis support plate 26 at motor mount 27 by fixed support 30 and floating support 32, the significance of which will be discussed below. It will also be seen that pinion gear 19 will, in response to movement of motor shaft 20, drive gear rack 17 to, as illustrated, the left or right along guide shaft 22. Guide shaft 22 is attached to chassis support plate 26 by retainer 34 secured by capbolt 35. Set screw 36 serves as a mechanical stop for gear rack member 17 though other physical and electronic means may be utilized as discussed below.

As chassis member 12 thus is moved by motor 24, read/write head 15—more accurately portrayed—will be accurately positioned relative to disk 37 secured to spindle 38 for rotation around shaft 40 in a conventional manner. As is well known, rotation of disk 37 induces read/write head 15 to "fly" on a thin cushion of air on the order of ½ to 1 microns above disk 37.

Since the distance between adjacent concentric data tracks (not shown) on disk 37 can be on the order of 1 to 4 thousandths inch, it is of the utmost importance that read/write head 15 maintain a precise position relative to shaft 20 of motor 24. This can be a most troublesome problem under conditions of varying temperatures in that the thermal coefficients of expansion of differing metals can account for dimension changes a significant portion of the distance between adjacent data tracks. Further, it is often necessary that head load arm 14 be of a spring steel material, while the remainder of the device, including disk 37, is preferably formed of aluminum. Since the coefficients of expansion of different parts of the device may be of different magnitudes, thermal changes thus would not be accommodated by equal growth of the various constituents. Accordingly, motor 24, which is of steel construction with regard to thermal expansion and thus has a coefficient of expansion substantially the same as head load arm 14, is attached to motor mount 27 in such a manner that the distance between motor shaft 20 and fixed support 30 is substantially equal to the length of head load arm 14.

Floating support 32, which may include a nylon washer 33 thereunder, serves to locate motor 24 on motor mount 27, but does not constrain motor 24 from moving laterally relative to motor mount 27 at floating support 32. Since the rigid mounting of motor 24 is only at fixed support 30, and since the distance between fixed support 30 and motor shaft 20 is substantially equal to the length of head load arm 14, it will be seen that the two steel components will provide compensating expansion during temperature changes, assuming, as can be selectively chosen with the rack and pinion actuator, that the significant components of the device are aluminum. In this manner the positioning of read/write head 15 relative to disk 37 can be maintained substantially constant through appreciable temperature changes of the overall device.

Turning now to FIG. 3, it will be noted that carriage member 12 is slidable supported on guide shaft 22 thereby permitting rotation of carriage member 12 around guide shaft 22. Roller 42 rotatably carried on shaft 43 supported in articulated arm 44 is resiliently urged towards hardened preload track 46 of carriage member 12, as is illustrated in more detail in FIG. 4. Thus by tending to rotate carriage member 12 around guide shaft 22, gear rack 17 is maintained in contact with pinion gear 19 under a constant force. In the event of wear of either or both of gear rack 17 and pinion gear 19, such preload force will minimize position changes therebetween and maintain the substantially lash free interface and, accordingly, the accurate response of read/write head 15 to incremental movement of motor 24. Also, such preload of roller 42 provides for positive interfacing of gear rack 17 with pinion gear 19 to minimize the possibility of the gear teeth jumping a cog.

As particularly shown in FIG. 4, articulated arm 44 is attached to chassis support plate 26 at pivot 52 and urged towards preload track 46 of carriage member 12 by spring 48. Set screw 50 under roller 42 may be adjusted at assembly to insure that rack 17 and pinion 19 can not become unmeshed.

Still with reference to FIG. 4, it will be noted that slanting surface 53 is provided at one end of gear rack 17 to interface with cooperating statically mounted slanting surface 54. In the event of inadvertent overdriving of carriage member 12 towards disk 37, slanting surfaces 53 and 54, which serve as crash stops, generate an inclined plane induced movement of gear rack 17 towards pinion gear 19 thus tending to stall motor 24 as opposed to allowing jumping and skipping of teeth between gear rack 17 and pinion gear 19, with possible stripping of the teeth. Such inclined crash stops 53 and 54 allow a modest preload between gear rack 17 and pinion gear 19 while avoiding catastrophic failure such as stripped gears if normal travel limits are exceeded. Thus it is preferred that, in one embodiment of the invention, such inclined crash stops be provided to avoid gear damage. In another variation of the invention, projection 56, shown on gear rack 17, may be provided to intercept a beam of radiation between a source of radiation (not shown) and a sensor for the radiation (not shown) to thus electronically disable and/or zero point the stepping motor circuitry.

Turning now to FIG. 5, the details of carriage member 12 are shown. Gear rack 17 is attached to carriage member 12 by capbolts 58 while oil impregnated bushings 60 are inserted in the channel 62 defined lengthwise through carriage member 12 to accommodate guide rod 22 as discussed above. Bushings 60 serve a particularly significant function in the preferred embodiment of the invention. Oil impregnated materials are utilized to form bushings 60 such that a film of lubricating oil is provided at the surface of bushing 60. Typically such bushings have voids defined therein and may be formed of either metal or polymeric materials, as is well known. In addition to the more apparent function of facilitating sliding movement between bushings 60 and guide shaft 22, such oil film serves to damp movement of carriage member 12 in an extremely desirable fashion as a function of relative velocity. During substantial, rapid movements of carriage member 12 on guide shaft 22, readily overcome but substantial visous drag is exerted by such oil film. Accordingly, when motor 24 ceases movement, the oil film rapidly arrests any induced oscillations. However, should read/write head 15 be minutely displaced from the desired position with but a small force available to properly position read/write head 15, the oil film, at low velocities, provides a substantially resistance free interface between bushings 60 and guide shaft 22. Accordingly, carriage member 12 may move such minute distance to accurately position read/write head 15. By utilizing bushings 60 and the resulting film of oil, damping of movement is accomplished with little additional weight or cost. In this manner bushings 60 are made to serve a conventional and apparent function, i.e., lubrication of moving parts, but also provides a highly desirable low mass, low cost integral damping function. The degree of damping may be determined as a design variable by positioning roller 42 towards or away from guide shaft 22, or as a unit adjustment by changing the force exerted by spring 48, or by selecting the viscosity of the oil.

Although the above discussion is directed only to the more significant aspects of the invention, it will be recognized that the mechanism of concern provides for a simple, yet highly accurate and lash free drive mechanism for locating read/write heads in, for instance, Winchester Drive devices. Though the discussion has been directed to the demanding applications of the Winchester Drive arrangement, it will be recognized that the positioning mechanism would be equally applicable for other mechanical and/or optical recording and reading mechanisms, i.e., laser devices. A simple, low cost, low mass yet dependable and highly accurate drive mechanism is disclosed. Of particular note is the ability to utilize a stepping motor through multiple revolutions, while compensating for any wear in the gear drive and maintaining a positive, lash free interface between the gear members. Damping of the movement is efficiently and effectively accomplished by a most simple oil impregnated bushing arrangement which provides substantial resistance to rapid movement but facilitates slow movement thereby optimizing damping of unwanted oscillations while permitting precise location of the read/write head. In a particularly preferred embodiment, the majority of the components are typically formed of aluminum, but certain critical components such as the head load arm is formed of steel with the motor mounted in a particular manner to provide thermal expansion compensation for the differing materials. As a result of these several significant and important features, the method and apparatus of the instant invention provide for low cost, highly accurate yet trouble free positioning of read/write heads in disk type data storage and retrieval devices.

Although only limited embodiments of the present invention have been specifically illustrated and described, it is anticipated that various changes and modifications will be apparent to those skilled in the art, and that such changes may be made without departing from the scope of the invention as defined by the following claims.

We claim:

1. Apparatus for positioning at least one interactive head relative to at least one disk member, the positioning apparatus comprising:
    a common carriage member connected to said at least one head in supporting relationship, the carriage member being operably connected in a fixed manner to the interactive head;
    a single guide shaft operably coupled to said common carriage member and supporting the carriage member for linear movement therealong;
    a gear rack positioned along one surface of said common carriage member and extending in a direction parallel to the guide shaft;
    a drive motor having a rotatable motor shaft positioned adjacent the gear rack;
    a pinion gear carried on the motor shaft for engaging said gear rack; and
    biasing means bearing upon said common carriage member for urging the carriage member to pivot about said guide shaft, thereby preloading said gear rack into substantially lash free engagement with the pinion gear;
    whereby the drive motor linearly drives said carriage member along the guide shaft, with the gear rack and pinion gear preloaded to maintain lash free, positive engagement as a result of the biasing means urging the carriage member around the guide shaft to thus avoid disengagement of the gear teeth and to compensate for wear.

2. Positioning apparatus as set forth in claim 1 in which the biasing means comprise a roller member and articulated arm, the roller member being journaled to the articulated arm, and a spring positioned to bear upon the arm and urge the roller member into forceful engagement with the carriage member.

3. Positioning apparatus as set forth in claim 2 in which the roller member bears upon said common carriage member at an engagement area defined on said common carriage member with a force perpendicular to the longitudinal axis of said guide shaft.

4. Positioning apparatus as set forth in claim 1 in which said at least one interactive head is one of a plurality of read/write heads carried on head load arms attached to said common carriage member for linear movement and positioning by the movement of said common carriage member along the guide shaft.

5. Positioning apparatus as set forth in claim 1 which further includes damping means to damp movement of said common carriage member relative to the guide shaft.

6. Positioning apparatus as set forth in claim 5 in which said common carriage member has a single linear channel defined therethrough for receiving said single guide shaft; and in which the damping means comprises oil impregnated bushings positioned in the single linear channel of said carriage member and bearing upon the guide shaft to hydrodynamically damp movement therebetween as a result of the viscous drag of the oil exuded from the oil impregnated bushings.

7. Positioning apparatus as set forth in claim 1 in which said common carriage member includes a surface at an end portion thereof disposed at a small angle relative to the normal of the axis of said guide shaft, and a fixed surface parallel to the last-mentioned surface positioned as an end stop of the carriage member, the respective surfaces comprising stops adapted to produce an inclined surface interaction to urge the gear rack into firm engagement with the pinion gear upon contact between said surfaces.

8. Positioning apparatus as set forth in claim 1 additionally comprising a base structure, said base structure, common carriage member, gear rack and disk member being made of a common material, and further including at least one head load arm for mounting said at least one interactive head to said common carriage member, the at least one load arm being formed of a material having a different thermal coefficient of expansion than that of said common material but similar to that of the drive motor, said mounting means for fixedly attaching said drive motor to said base structure, said mounting means being disposed at a position spaced from the motor shaft a distance approximately equal to the length of said at least one head load arm.

9. Positioning apparatus as set forth in claim 8 in which the drive motor is a stepper motor.

10. Apparatus for linearly positioning a plurality of read/write heads relative to a plurality of rotatable disk members, the positioning apparatus comprising:
a base rotatably carrying the disk members;
a guide shaft;
a carriage assembly mounted for translational movement relative to the guide shaft;
a read/write head-suspension assembly coupled to the carriage assembly and supporting the read/write heads;
a gear rack positioned at one surface of the carriage member with the major dimension of the gear rack oriented in a direction parallel to that of the guide shaft;
a drive motor having a rotatable shaft extending therefrom in a direction perpendicular to said major dimension of the gear rack;
a pinion gear secured to the motor shaft;
preload means forcefully urging the carriage assembly to pivot about said guide shaft to bring the gear rack into substantially lash free engagement with the pinion gear; and
means for compensating for thermal expansion of said carriage assembly, read/write head-suspension assembly and drive motor to prevent displacement of said heads relative to said disk members even in the presence of thermal expansion.

11. Positioning apparatus as set forth in claim 10 including stop means positioned on at least one end of the carriage assembly, the stop means including a first inclined plane defined on the carriage assembly and cooperating with a second, fixed inclined place parallel to the defined plane and secured to the base, the stop means upon engagement of the two planes providing for termination of movement of the carriage assembly while concurrently generating a force between the inclined planes tending to rotate the carriage assembly and attach the gear rack into more secure engagement with the pinion gear.

12. Positioning apparatus as set forth in claim 10 in which the thermal expansion compensating means is comprised of two materials having differing thermal coefficients of expansion, the base, carriage assembly and disk members being of a first of said materials, and the read/write head-suspension assembly and drive motor being of the second material, with the motor being operably secured to the base at a location spaced from the pinion gear a distance approximately equal to the length of the support arms in the direction from the pinion gear parallel to the length of the load arm.

13. Positioning apparatus as set forth in claim 10 in which damping means is provided to damp movement between the carriage assembly and the guide shaft.

14. Positioning apparatus as set forth in claim 13 in which said carriage assembly has a linear channel for receiving said guide shaft; and in which the damping means comprise at least one oil impregnated bushing positioned in the linear channel of said carriage assembly and movably interfacing between the carriage assembly and the guide shaft.

15. Positioning apparatus as set forth in claim 12 in which said thermal expansion compensating means further comprises motor mounting means, fixed support means for fixedly mounting said drive motor at one location thereof to said motor mounting means, the distance between said fixed support means and the rotatable shaft of said drive motor being approximately equal to the length of the head-suspension assembly, and floating support means for locating said drive motor on said motor mounting means while permitting lateral movement of the rotatable shaft of said drive motor relative to said fixed support means.

* * * * *

UNITED STATES PATENT AND TRADEMARK OFFICE
CERTIFICATE OF CORRECTION

PATENT NO. : 4,428,012
DATED : January 24, 1984
INVENTOR(S) : Roy A. Applequist et al.

It is certified that error appears in the above-identified patent and that said Letters Patent are hereby corrected as shown below:

Claim 8, line 10 (column 7, line 42), "said mounting"

should be --and mounting--.

Signed and Sealed this

Third Day of April 1984

[SEAL]

Attest:

GERALD J. MOSSINGHOFF

Attesting Officer   Commissioner of Patents and Trademarks